United States Patent [19]
Przygoda, Jr. et al.

[11] Patent Number: 5,438,607
[45] Date of Patent: Aug. 1, 1995

[54] PROGRAMMABLE MONITORING SYSTEM AND METHOD

[75] Inventors: Chester T. Przygoda, Jr., Troy; Daniel J. Serafin, Jr., Rochester, both of Mich.

[73] Assignee: U.S. Monitors, Ltd., Madison Heights, Mich.

[21] Appl. No.: 981,362

[22] Filed: Nov. 25, 1992

[51] Int. Cl.⁶ .......................................... H04M 11/04
[52] U.S. Cl. ..................................... 379/38; 379/40; 379/49; 379/142
[58] Field of Search .................. 379/37–40, 379/42, 44, 45, 49, 57, 210, 142, 127; 340/825.49, 825.44, 825.37, 534, 531, 311.1, 534, 693; 455/66

[56] References Cited

U.S. PATENT DOCUMENTS

| | | |
|---|---|---|
| 4,063,410 | 12/1977 | Welling . |
| 4,160,246 | 7/1979 | Martin et al. . |
| 4,168,494 | 9/1979 | Hummel et al. . |
| 4,241,236 | 12/1980 | Nash . |
| 4,284,849 | 8/1981 | Anderson et al. ............ 379/38 |
| 4,339,746 | 7/1982 | Ulicki ........................... 379/50 |
| 4,446,454 | 5/1984 | Pyle ............................. 340/531 |
| 4,461,013 | 7/1984 | Lese et al. . |
| 4,488,555 | 12/1984 | Imran . |
| 4,524,143 | 6/1985 | Shapiro . |
| 4,524,243 | 6/1985 | Shapiro ........................ 379/38 |
| 4,542,262 | 9/1985 | Ruff ............................. 379/38 |
| 4,578,671 | 3/1986 | Flowers . |
| 4,598,275 | 7/1986 | Ross et al. . |
| 4,601,604 | 7/1986 | Shipley ........................ 379/38 |
| 4,661,804 | 4/1987 | Abel ............................. 379/40 |
| 4,675,656 | 6/1987 | Narcisse . |
| 4,743,892 | 5/1988 | Zayle ........................... 379/38 |
| 4,760,593 | 7/1988 | Shapiro et al. ................ 379/38 |
| 4,819,860 | 4/1989 | Hargrove et al. . |
| 4,827,943 | 5/1989 | Bornn et al. . |
| 4,854,328 | 8/1989 | Pollack . |
| 4,890,108 | 12/1989 | Drori et al. . |
| 4,908,602 | 3/1990 | Reich et al. . |
| 4,918,432 | 4/1990 | Pauley et al. . |
| 4,918,717 | 4/1990 | Bissonnette et al. ......... 379/45 |
| 4,951,029 | 8/1990 | Severson . |
| 4,952,928 | 8/1990 | Carrol et al. . |

(List continued on next page.)

FOREIGN PATENT DOCUMENTS

0051383 5/1982 European Pat. Off. ............ 379/51

OTHER PUBLICATIONS

Cost–Attractive, Reliable Remote Controls Use SAW Resonators, Reprint from Siemens Components Apr. 1990, pp. 142–145, J. Nietroj, W. Zapsky, H. Lang; undated.

(List continued on next page.)

*Primary Examiner*—Wing F. Chan
*Attorney, Agent, or Firm*—Harness, Dickey & Pierce

[57] ABSTRACT

A programmable monitoring system for personal use in a home, medical ward, office or other localized area features a radio receiving base unit and one or more low power, radio-frequency battery-powered wireless transmitter units, each capable of transmitting uniquely encoded pulse-encoded serial digital signals at a common high frequency to the base unit. The base unit has a superregenerative receiver and a microcomputer for deciphering and validating the encoded information to ensure that the coded signal originated with a transmitter unit associated with the base unit. The portable transmitters, once activated, send a coded signal to the base unit indicative of a distress or alarm situation or a low battery condition, and which transmitter unit is transmitting. The base unit deciphers the coded signal and automatically contacts a central monitoring station via a telephone link. The base unit sends the serial number of the base unit, and the specific condition requiring attention, i.e., medical, fire, low-battery, etc., to the central monitoring station. A voice message may optionally be generated by the base unit to indicate contact has been made with the monitoring station, and that help is being dispatched. The base unit has battery back-up and a self-test capability to help ensure the system is able and ready to operate when necessary.

37 Claims, 8 Drawing Sheets

U.S. PATENT DOCUMENTS

| | | |
|---|---|---|
| 4,958,645 | 9/1990 | Cadell et al. . |
| 4,974,607 | 12/1990 | Miwa . |
| 4,999,613 | 3/1991 | Williamson et al. . |
| 5,007,324 | 4/1991 | DeMichele . |
| 5,025,808 | 6/1991 | Hafner . |
| 5,045,839 | 9/1991 | Ellis et al. . |
| 5,086,391 | 2/1992 | Chambers . |
| 5,091,930 | 2/1992 | Shapiro .................................. 379/38 |
| 5,146,207 | 9/1992 | Henry et al. ........................... 379/38 |
| 5,287,398 | 2/2994 | Briault .................................. 379/38 |
| 5,305,370 | 4/1994 | Kearn et al. ........................... 379/45 |

OTHER PUBLICATIONS

Saw Two–Port Resonators, Crystal Technology A Siemens Company, Printed in U.S.A. Feb. 1987.

Maxim Programmable Voltage Detectors, Maxim Integrated Products, Printed in U.S.A. Aug. 1985, pp. 109–112.

Motorola Semiconductor Technical Data on Advance Information Single Chip 300 Baud Modem, Motorola Telecommunications Device Data, pp. 2–568–2–576; undated.

A Generic Micropower Saw Stabilized Superegenerative Receiver, RF Monolithics Darrell L. Ash; undated.

National Semiconductor Pamphlet for LM386 Low Voltage Audio Power Amplifier, pp. 1–28–1–31; undated.

Silent Knight, Supervised RF Installation Manual Nov. 28, 1984.

Lifeline ® Model H101A Communicator Service Manual, 1982.

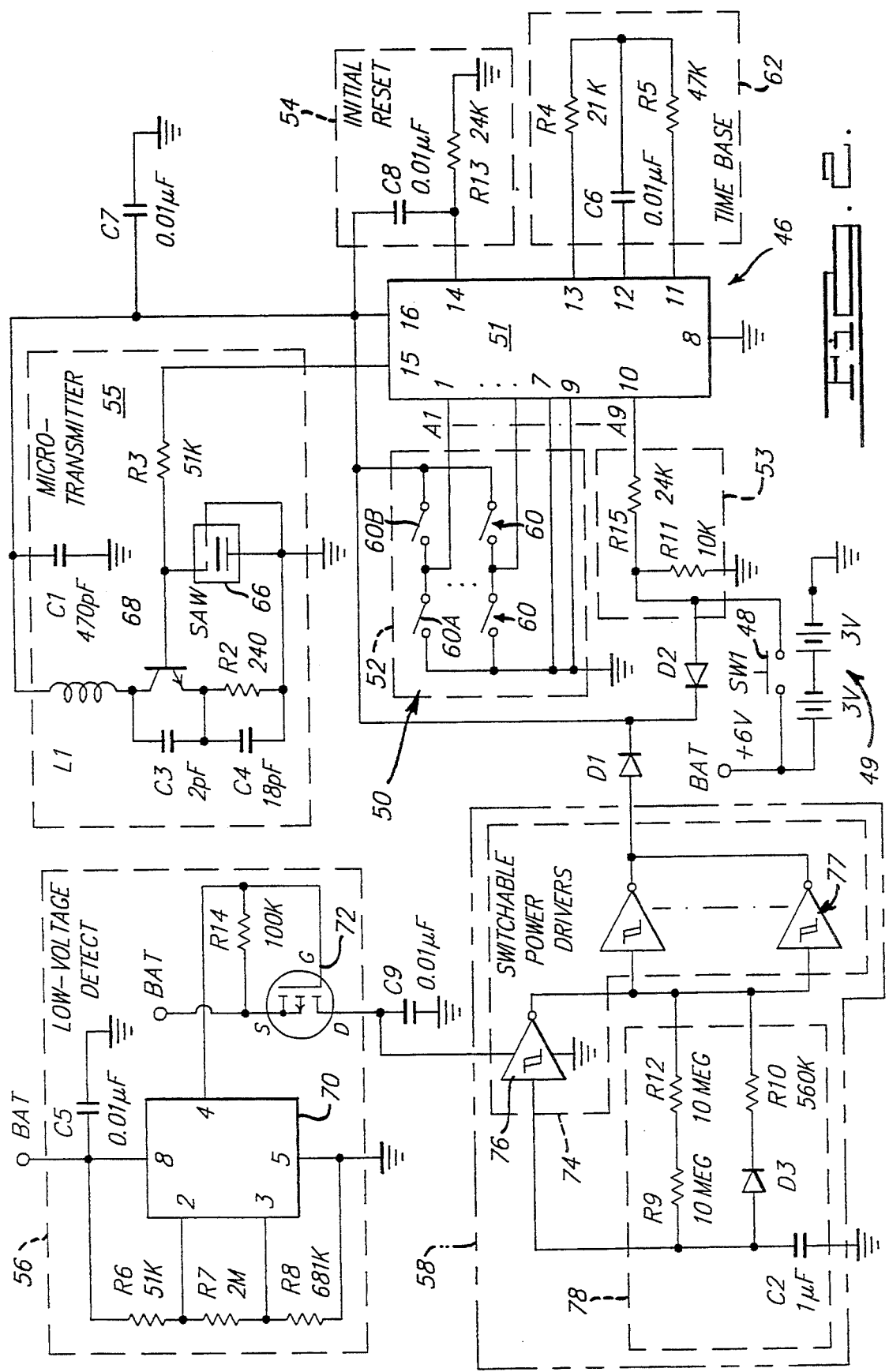

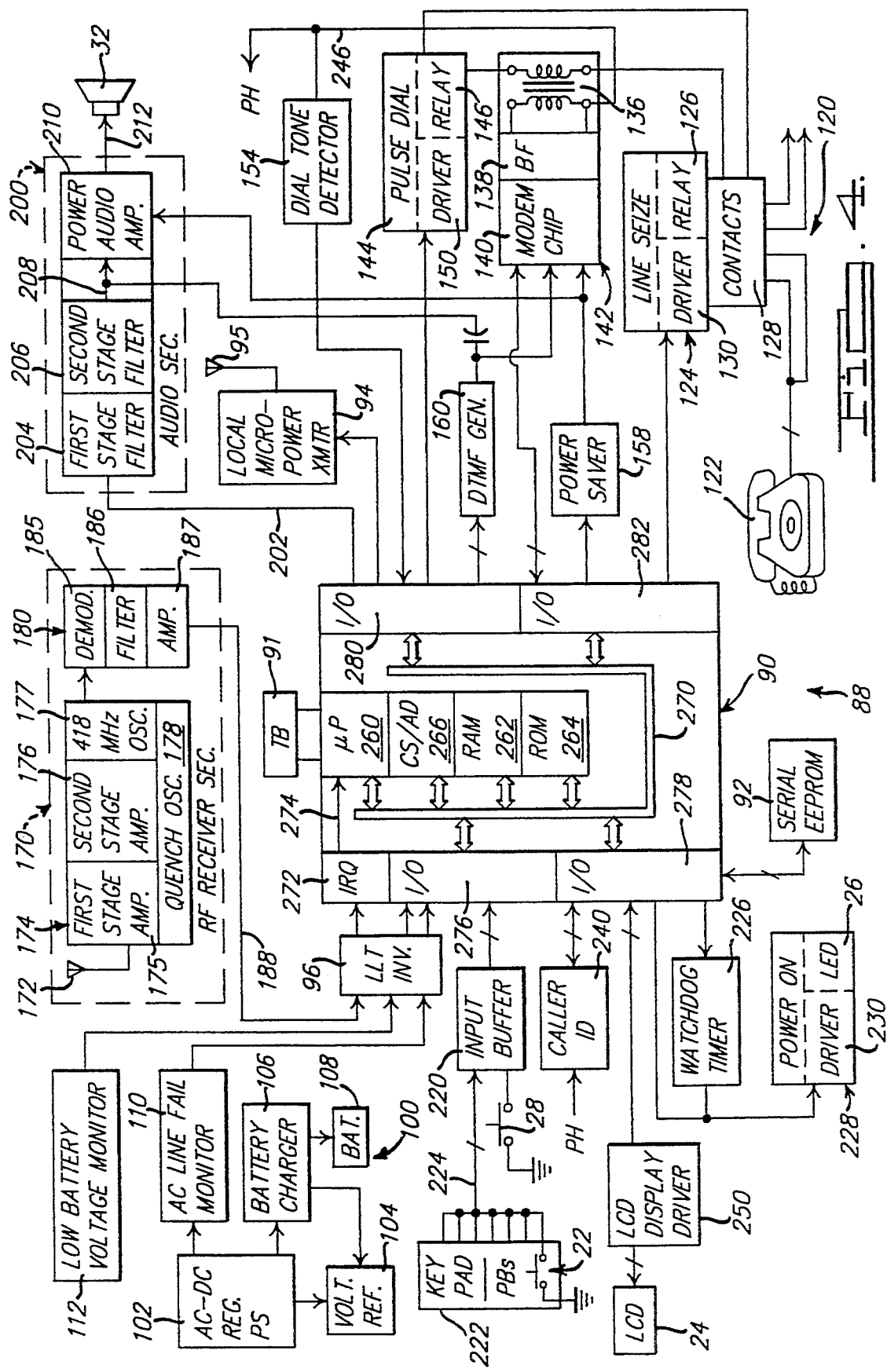

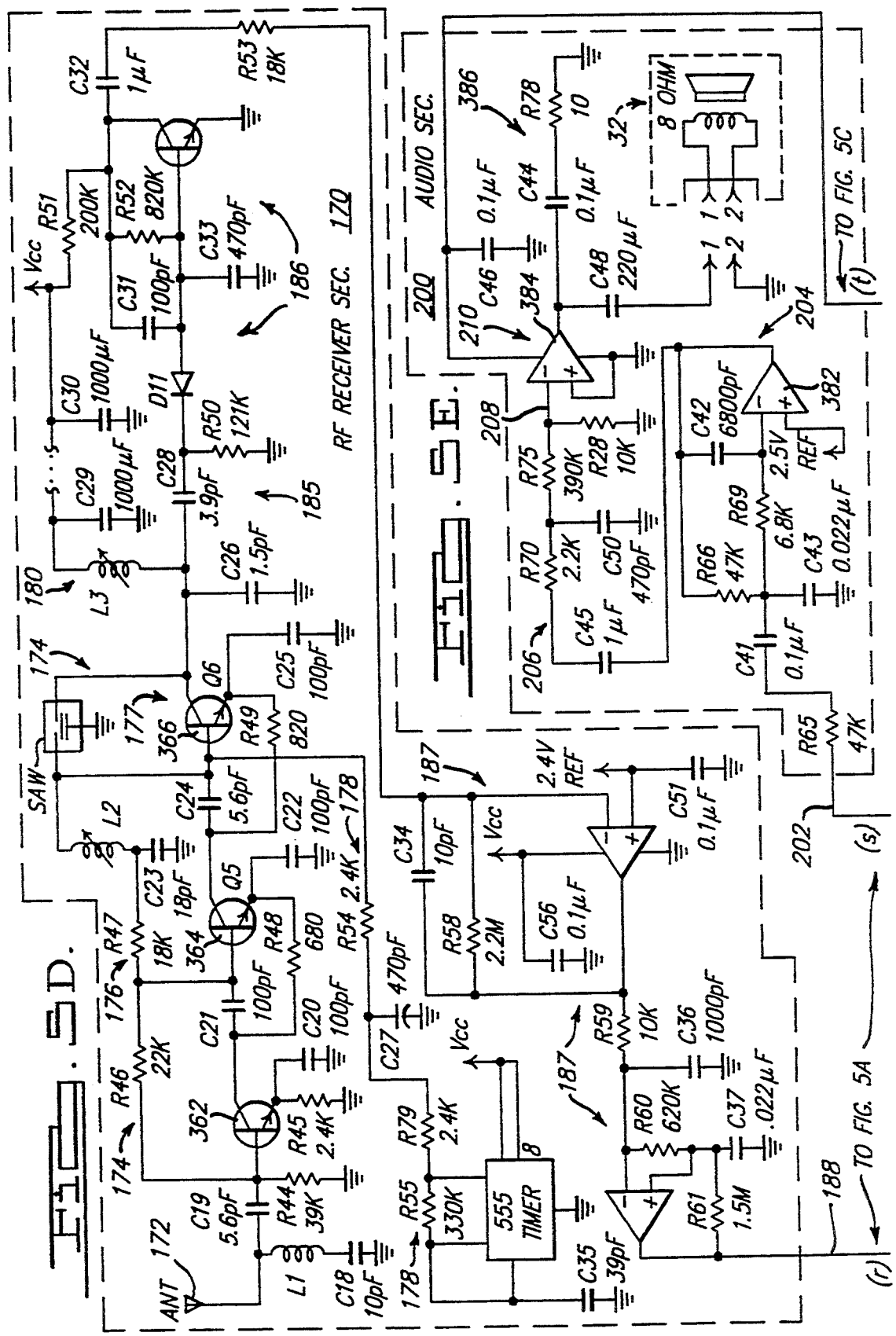

PROGRAMMABLE MONITORING SYSTEM AND METHOD

BACKGROUND OF THE INVENTION

1. Field of the Invention

This invention relates generally to a programmable personal monitoring system including a base receiver unit with a user control interface and a plurality of remote sensor units, for monitoring conditions existing within personal living, working or medical quarters and, more particularly, to a such a programmable personal monitoring system which includes a number of wireless remote self-powered transmitters each capable of transmitting distinct coded signals to a single base unit which has a voice interface and telephonic autodial communications capability with a central monitoring station.

2. Discussion of Related Art

Distress or alert situations requiring quick response times in order to avert possibly unfavorable outcomes occur with fair regularity. Situations of this type typically include fire alerts, urgent medical situations, security breaches, etc. In certain medical situations, as well as other distress or alarm situations, an affected person, especially an incapacitated or elderly person, may be limited in his or her ability to summon help. Places such as hospital wards or nursing homes often experience urgent medical situations requiring prompt attention as a matter of course. Likewise, in a fire alarm or a security breach situation, persons affected by these situations may be unaware of the impending circumstances at an early enough time to mitigate the outcome. Consequently, it is sometimes desirable to provide additional devices beyond common communication systems to assist in minimizing or averting alert situations, or to provide a sense of increased safety.

Systems which are responsive to personal distress or emergency situations are known. A number of such systems monitor remote transmitters carried by individuals, which send out alarm or distress signals from remote locations to a central location or base unit. Applications for these kind of systems have included monitoring medical patients, prisoners, outdoor sports enthusiasts, convalescent home residents and the like. Such systems are disclosed in the following patents:

| No. | U.S. Pat. No. | Inventor(s) |
| --- | --- | --- |
| 1. | 4,603,410 | Welling |
| 2. | 4,524,243 | Imran |
| 3. | 4,675,656 | Narcisse |
| 4. | 4,819,860 | Hargrove et al |
| 5. | 4,827,943 | Bornn et al |
| 6. | 4,908,602 | Reich et al |
| 7. | 4,918,432 | Pauley et al |
| 8. | 4,951,029 | Severson |
| 9. | 4,952,928 | Carroll et al |
| 10. | 4,999,613 | Williamson et al |
| 11. | 5,045,839 | Ellis et al |
| 12. | 5,086,391 | Chambers |

An illustrative system is disclosed in U.S. Pat. No. 4,908,602 issued to Reich et al. That patent discloses a personal emergency response (PER) system which includes a central station and one or more remote subscriber stations, where each remote subscriber station includes a portable transmitting device. The central station can be any appropriate facility such as a hospital, fire department, or monitoring service which will provide assistance to an alarm condition. The subscriber station automatically summons help by activating the portable transmitter. The transmitter sends a radio transmission, or other suitable transmission such as infrared or ultrasonic transmissions, which is received by a subscriber unit, and which in turn automatically contacts the central station. The communications link between the central station and the subscriber station can be by any appropriate technique, and typically is telephone communication lines.

Although the basic concept of a personal response system is known in a number of variations designed for different purposes, there is still room for improvement of these systems and their associated component parts, such as the wireless transmitters and base units. By increasing the integrity of a particular system, and improving the ease of using the system, it is possible to increase user confidence and satisfaction. It is therefore a general goal of the present invention to provide a remote monitoring system for monitoring distress or alert situations which provides a number of advantages over known systems and devices, and increase the ease of use, integrity and user-friendliness of the system.

Thus, a first object of the present invention is to provide a highly energy-efficient, low-cost, wireless transmitter unit, actutable by a person in distress, which includes means for saving battery power in a standby mode, so the batteries do not have to be changed as often.

A second object is to provide a wireless transmitter unit that includes a low voltage detector circuit that continuously monitors battery voltage, and automatically generates a low battery condition signal on an intermittent basis, to indicate when the battery should be changed.

A third object is to provide a wireless transmitter which has encoding means for positively and inexpensively assigning a transmitter identification code to a given transmitter unit through the physical elements within the unit. Our intent is to provide a transmitter unit that can easily be programmed, using physically settable encoding means, to one of eight distinct "channels", with each channel being at the same frequency, but having a different serial digital code, so as to represent a different class or type of condition.

A fourth object of the present invention is to provide a base unit which has two modes of establishing a telephone link-up, to increase the likelihood of contacting the central station under adverse phone system conditions.

A fifth object is to provide for audio and visual verification at the base unit that the desired communications link with a central station has been established, and that the requested help is being summoned.

A sixth object is provide a personal monitoring system with a base unit having a caller ID circuit and a local memory for storing phone numbers so that the base unit can selectively recognize calls from the central station or specified other phones, and selectively permit certain actions. The permitted actions include reprogramming the base unit, and taking or not taking certain action, such as cutting off or refraining from cutting off certain incoming calls, all in accordance with information stored in the local memory.

A seventh object is to provide for a simple, easily understood user interface on the base unit for the foregoing caller ID function, which may include a speaker and an optional alphanumeric display.

An eighth object is to provide an AC-powered base unit with a modem and line-seize capability, and which also has a back-up battery, with circuitry for monitoring for AC line fail and low-battery conditions, and with means for saving battery power.

A ninth object of the present invention is provide a radio-receiving base unit with self-test capability, including test and cancel buttons, so that a user or service technician can verify correct operation of all critical aspects of the personal monitoring system.

A tenth object is to provide signal means for informing a user that the microcomputer of the base unit is not ready to respond, but instead requires service.

SUMMARY OF THE INVENTION

In an effort to satisfy the foregoing objects, there is provided, in a first embodiment of the present invention, a remote monitoring system which can be used to simultaneously monitor a number of potential distress or alert situations such as medical alerts, fire alerts and security breaches. In this preferred embodiment, a plurality of transmitting units are positionable in a common area around a base receiving unit. In one particular use the transmitting units can be portable units worn or carried by individuals, such as infirm or elderly persons. The transmitting units are activatable, by a switch or other means, such that they will emit a coded radio frequency transmission indicative of the type of situations they were intended to monitor. The base unit receives the coded transmission signals from the transmitting units and deciphers them. Upon receipt of the coded signal the base unit will automatically make telephone contact with a central monitoring station. The telephone communication from the base unit to the monitoring station transfers information including the serial number of the base unit, the specific distress or alert triggered. The monitoring station will return a verification signal and the base unit will respond to the verification signal by playing an audible prerecorded message of verification.

In a preferred embodiment of the transmitting unit, there is provided an encoding circuit which has a plurality of three-state switches that are operable to selectively set the encoding scheme of the transmission in order to establish the coded signal indicative of a particular distress or alert. The transmitting unit also includes a Colpitts oscillator circuit which generates a carrier frequency preferably at approximately 418 MHz to transmit the encoded signal. Additionally, the unit is battery-powered, and has a low voltage detect circuit in order to detect a low battery voltage condition when the battery output power falls below a minimum threshold level. The unit further includes a low voltage oscillator circuit which generates an intermittent signal to automatically be emitted by the transmitter unit when low battery power is detected.

In this first embodiment of the monitoring system, there are a number of "channels" operable to respond to all of the encoded signals from each of the transmitter units and contact the central monitoring station. These channels are all of the same frequency, and are distinct by virtue of being serially encoded with different bit patterns. The base unit further includes a cancel switch and associated cancel circuitry for cancelling a false alarm condition. Additionally, the base unit may include a test switch and its own local micropower transmitter for testing the receiver circuitry of the base unit. The base unit further includes a watchdog timer circuit in order to monitor the microprocessor for possible malfunctions within the unit.

Additional objects, advantages, and features of the present invention will become apparent from the following description and appended claims, taken in conjunction with the accompanying drawings.

BRIEF DESCRIPTION OF THE DRAWINGS

FIG. 2 is a schematic diagram of a preferred hand-portable transmitting unit of FIG. 1;

FIG. 4 is a detailed block diagram of the base unit of FIG. 1; and

DETAILED DESCRIPTION OF THE PREFERRED EMBODIMENT

The following discussion of the preferred embodiment of our programmable personal monitoring system is merely exemplary in nature and is in no way intended to limit the manner in which the claimed invention may be implemented or its application or uses.

Figure 1:
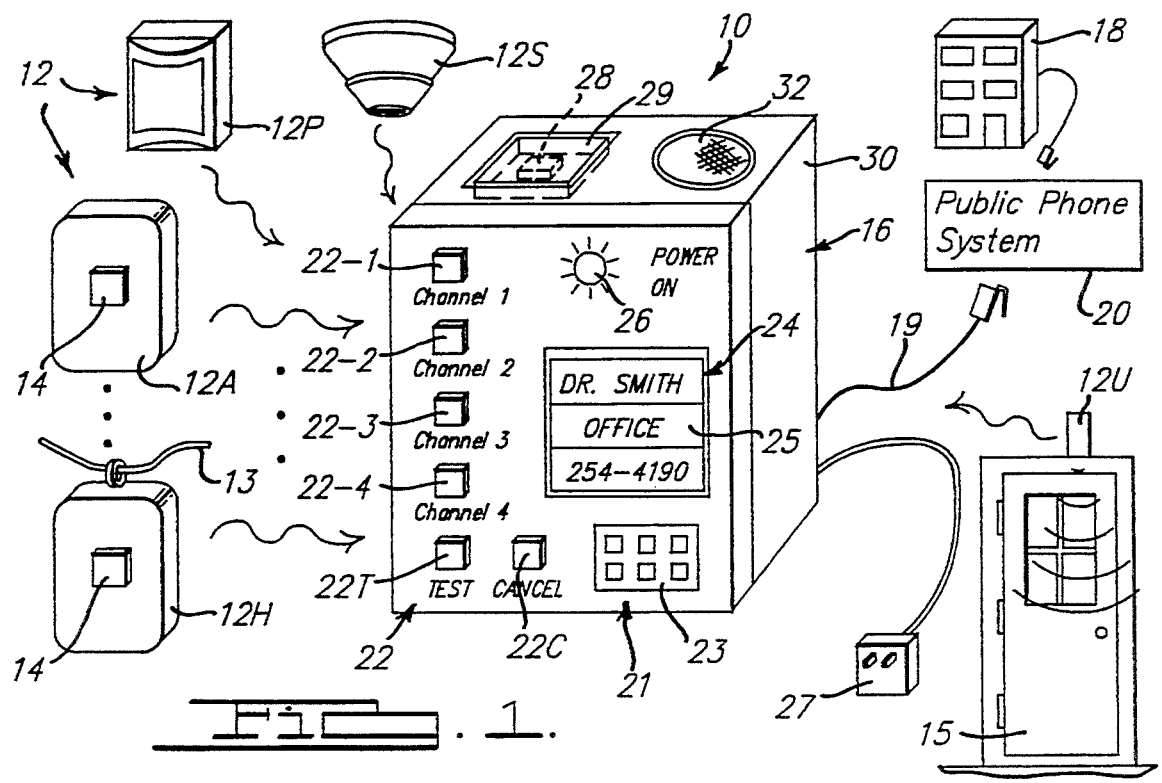
FIG. 1 is a perspective overview of a personal monitoring system including a plurality of transmitting units and a single base unit according to one preferred embodiment of the present invention.

FIG. 1 is an overview of a programmable personal monitoring system 10, according to one preferred embodiment of the present invention. The monitoring system 10 includes a series of remote wireless transmitting units 12 which, upon activation of a switch or pushbutton 14, emit a low-power encoded radio frequency signal, or possibly other types of coded signals, to be received by a base unit 16. The switch 14 can be activated manually or by other stimulus such as shock, vibration, fire, smoke, heat, etc. The remote units 12 are preferably battery-powered or solar-powered with battery back-up so as to not require dedicated wiring in the quarters where the system 10 is being used.

In a preferred embodiment of the system 1 0, there are up to eight transmitting units 12 which may be selectively encodeable with a particular class or type of distress or alert situation. This is illustrated by miniature, pendant-type transmitters 12A through 12H. As will be discussed in detail below, each transmitter unit 12 preferably sends a high-frequency digitally encoded transmission which is deciphered by the base unit 16, which thereafter automatically makes contact with a monitoring station 18.

The transmitting units 12 can be portable, pendant-type transmitters 12A through 12H with a cord 13 or a belt or velcro-patches worn by individuals, such as incapacitated, recuperating or elderly persons who are or may be susceptible to increased medical risk. Additionally, the transmitting units 12 can be detectors including a transmitter for detecting a fire alert such as smoke detector 12S. In this case, the switch 14 would be automatically activated on the detection of smoke or heat, as is well understood in the art. Furthermore, the transmitting units 12 can be detectors, such as passive infrared intrusion detectors such as unit 12P or active ultrasound or doppler detectors such as detector 12U, for monitoring security integrity within a security area as is also well understood in the art. In this case, also, an internal switch equivalent in function to the switch 14 would be automatically activated upon a security breach, such as the opening of the door 15. In addition, other types of sensors for detecting other potential risk situations can also be incorporated into or with a transmitting unit 12. Of course, the series of transmitting units 12 could consist of a combination of any or all of the different transmitting units as just described. The power levels of the radio signals transmitted by the wireless units 12 are preferably kept at a low level of power which does not exceed FCC requirements and avoids interference with similar systems, and also reduces the battery size, cost and overall size of the transmitting units 12.

The base unit 16 is positioned within a predetermined maximum distance, for example, about 100 to about 300 feet, depending upon transmission power and signal path obstructions, of all of the transmitting units 12. By being centrally located, the base unit 16 should be capable of receiving and deciphering the encoded signals. The base unit 16, upon receipt of an alert encoded signal from whichever transmitting unit 12 is activated, deciphers this signal to determine the applicable distress or alert situation as represented by the coding scheme of the signal. Once the base unit 16 deciphers the encoded signal, unit 16 automatically contacts a remotely located central monitoring station 18, preferably via a telephone communications link through private phone lines 19 and the public phone system 20. The monitoring station 18 may be a fire or police department, monitoring hospital, or doctor's office, but preferably is a 24-hour manned control alarm monitoring service, with trained operators to help evaluate perceived conditions at the base unit location. In other words, depending on what distress or alert situation the base unit 16 determines is present from the coded signals received from one or more of the transmitting units 12, the base unit 16 will dial a pre-programmed telephone number to automatically contact the necessary personnel for response to this distress or alert condition. In the event that no telephone contact is made, the base unit 16 will attempt to dial a second pre-programmed telephone number. The base unit 16 will continue dialing these numbers until contact is established. In a preferred embodiment, the telephone transmission will be performed in a touch-tone mode and then a pulse mode to help maximize the likelihood of getting through under adverse public telephone line conditions.

The telephone communication from the base unit 16 provides a digital code including the serial number of the unit 16 and the specific distress or alert situation indicated, including, if desired, which particular transmitting unit 12 has transmitted the alarm. The central station 18 may use caller ID technology to determine the telephone number of the originating base unit 16 in order to provide a cross-verification of the legitimacy of the alarm. The method of initial contact between the base unit 16 and the monitoring station 18 preferably is in the form of a conventional dual tone multi frequency (DTMF) scheme, since this is quicker than rotary dialing techniques. Once the communications link is established, then conventional full duplex or half duplex modem communication at a suitable baud is used so that the microcomputers in the base unit 16 and in the central station can talk back and forth. Upon receipt of a distress call, the monitoring station 18 will trigger a pre-recorded message within the base unit 16 such that if a person in distress is within the requisite distance of the base unit 16, then that person will be reassured by the voice communication that personnel at the monitoring station 18 are dispatching help. This prerecorded voice message is stored within the base unit's memory, and can say, for example, that it has established a communications link with the monitoring station 18 and successfully transmitted the distress signal to the monitoring station 18. The monitoring station 18 may additionally provide a cross-verification including the serial number of the base unit to be displayed.

The base unit 16 preferably includes a front panel 21 which contains the operator interface control and display of the base unit 16. This interface and display panel 21 includes a series of switches 22-1 through 22-4 for selecting different channels of operation. It also has switches 22T and 22C for "test" and "cancel" functions. The switches 22 may take any conventional form of pressure sensitive electronic contact switches. Each of the different channels are manually activatable to provide an indication of a different class or type of distress or alert situation. In this regard, switch 22-1 for activating channel 1 may be used to indicate a medical alert, switch 22-2 for activating channel 2 may be used to indicate a fire alert, and switch 22-3 for channel 3 may be used to indicate a police alert. Switch 22-4 for channel 4 may optionally be used to automatically contact desirable personnel, such as a doctor or relative. Of course, additional switches for other distress or alert situations may also be incorporated, if desired, to give the person at the base station more choices as to who to contact, or the specific type of distress condition encountered. For example, individual switches 22 may be provided for contacting a neighbor or a private security force.

A numeric keypad 23 may be incorporated on the base unit 16 to arm or disarm one or more of the channels. Such a mechanism has application as an alarm system where a personal identification code may be entered to arm the system when a person leaves a secured areas such as a dwelling, and disarm the system when the person re-enters the dwelling. Additionally, the base unit 16 can be programmed by keypad 23 to respond to a different set of transmitters not associated with the base unit 16.

In addition, test switch 22T and cancel switch 22C may be incorporated on the display panel 20, if desired. The pushbutton test switch 22T, when momentarily depressed activates a diagnostic self-test mode of the base unit 16, which can, if desired, transmit the resulting test information to the monitoring station 18. The test mode of the base unit 16 activates an internal transmitter like those found in transmitter 12 to test the operation of the radio frequency (RF) receiver section (including demodulator) and the microcomputer within the base unit 16. This test may be performed after a telephonic link-up is established and the user is prompted to trigger the test input as initiated by the monitoring station 18. The cancel switch 22C enables the distressed person to send a cancel signal to the monitoring center 18 in the event that a false alarm or alert has been erroneously or prematurely broadcasted. The monitoring station 18 will send a verification code that the cancel signal was received and understood.

On the front panel 21 of the base unit 16, a two-dimensional alphanumeric display 24, which may have one or more rows of characters 25 and a power on light 26, providing an indication that the base unit 16 is indeed operating, may be provided. The alphanumeric display 24 may be of any conventional or suitable type, including liquid crystal display (LCD) or a light-emitting diode (LED) display. In the display 24 shown in FIG. 1, the legend "DR. SMITH" OFFICE 254-4190 appears on the three lines 25 of the display. This particular message may be displayed in response to pushing switch 22-4 to summon the user's personal physician, Dr. Smith, whose office phone number is 254-4190. The light 26 may be of any suitable type, including an LED for long life. Its operation will be explained later. A power on switch is preferably not provided in the base unit 16, since the monitoring system 10 is preferably kept continuously operational around the clock, day after day.

Preferably, the base unit 16 is powered through a low voltage AC adapter 27 from an electrical outlet providing AC power (not shown in FIG. 1). The base unit 16 preferably includes back-up battery power to ensure normal operation for a significant period of time after AC power has been removed from the unit 16, as sometimes occurs during unexpected power outages. A charging circuit maintains the back-up battery in its fully charged state during times when it is not in use.

The monitoring system 10 may also include the ability to be re-programmed remotely from the monitoring station 18 with respect to certain operating characteristics of the base unit 16, such as a change in phone numbers to be dialed. Optionally, with sufficient memory capacity, a change in the pre-recorded message to be played, or a change in internal operating instructions used by the microcomputer within the base unit 16, may be accomplished. A user is preferably instructed over a conventional phone by a service technician at the monitoring station 18 to activate a program button 28 and then to discontinue the call. The program button 28 may be located on top of the housing 30 of the base unit 16 recessed under a hinged cover 29. A speaker 32 may also be provided in the top of the housing 30. Those in the art will also appreciate that the program button 28 and the speaker 32 may be placed at any other convenient location on the surface of front cover 21 or housing 30, or even within the base unit 16. The programming activity at the monitoring station 18 may be made in any conventional manner such as by modem or by a touch-tone phone which generates DTMF signals.

The basic overall operation of the remote monitoring system 10 shown in FIG. 1 has been described above to make it easier to follow and appreciate the detailed description of a typical wireless transmitting unit 12 and the base unit 16 which follows.

Turning to FIG. 2, a more detailed discussion of the internal structure and operation of one of the transmitting units 12 will be given with reference to the FIG. 2 schematic diagram representing a preferred transmitter unit circuit 46 depicting the key features of a transmitting unit 12. User-actuated switch 48, which is preferably a pushbutton, is provided to activate the transmitting circuit 46, and is one form the switch 14 described in FIG. 1 may take. Upon activation of the switch 48, battery power from a battery 49 (preferably two, three-volt BR-type lithium batteries which have long shelf-life) is applied to the circuit 46. The circuit 46 can be an all-inclusive part of a transmitting unit 12, specifically one which is manually activated, such as would generally be used as a pendant transmitter 12A worn or carried by a person at medical risk. However, if the transmitter circuit 46 is used in conjunction with a fire detector or security detector, as mentioned above, then the switch 48 would be automatically activated by other circuitry (not shown) upon detection of the appropriate conditions (smoke or security intrusion). In these alternate forms of wireless transmitting units 12, switch 48 would typically be a relay contact or a solid-state switch, such as a transistor.

The overall transmitter unit circuit 46 includes four sections or circuits. These include a serial encoder circuit 50, including an encoder chip 51 and transmitter identification ("XMTR-ID") circuit 52, a condition code circuit 53, an initial reset circuit 54 and a time base circuit 62 Colpitts oscillator for applying a carrier frequency to an encoded data bit stream received from the serial encoder circuit 50 for transmission; a low battery voltage detector circuit 56 for detecting a low battery condition; and a low voltage detect oscillator timer circuit 58 for providing a specially timed signal to the encoder circuit 50 upon indication from the low battery detect circuit 56 that the battery 49 is running low on power. The encoder chip 51 may be a conventional encoder producing a serial bit stream output, such as SGS Thompson or Motorola encoder no. M145026.

The encoder circuit 50, the microtransmitter circuit 55 and the low voltage detect oscillator circuit 58 do not receive continuous battery power. However, the low voltage detect circuit 56 is preferably continually being powered by the battery 49. In this regard, the low voltage detect circuit 56 is constantly monitoring battery voltage and upon detection of a low battery condition, will energize the timer circuit 58 to automatically provide a low battery signal to be transmitted to the base unit 16 in the event of this condition.

Diodes D1 and D2 are used to isolate the battery power from the low voltage detect oscillator circuit 58 when the switch 48 is depressed and pin 10 of the encoder circuit chip 51 when the oscillator circuit 58 indicates a low voltage signal. In particular, the diode D2 ensures that the low voltage battery signal coming through the diode D1 does not present a high signal to pin 10 of the encoder chip 51. Likewise, the diode D1 provides isolation to ensure that actuation of the switch 48 does not provide power back to the low voltage oscillator circuit 58.

When the switch 48 is depressed, this causes pin 10 of the encoder chip 51 to go "HI", which signifies that an alarm condition exists. However, when a low battery signal is generated, pin 10 remains "LOW". The resistors R11 and R15 help protect the encoder chip 51 against electrostatic discharge (ESD) which may occur when a user having static electricity activates the switch 48. Similarly, diode D1 helps to protect the oscillator circuit 58 against the same source of ESD.

Upon activation of the switch 48, the encoder chip 51 receives battery power at pin 16 and provides a serial bit data stream at pin 15 to be output as a coded signal by the Colpitts oscillator circuit 55. The coding scheme is selectively provided by a three-state XMTR-ID encoding circuit 52, including a two-state signal applied to pin 10. Circuit 52 may be constructed from a plurality of dual switches 60 applied to pins 1 through 7 and 9 of the encoder chip 51, as shown. As may be seen from switches 60A and 60B used to establish the input to pin 1, three states are possible; logical zero (switch 60A closed, switch 60B opened), logical "1" (switch 60A opened, switch 60B closed), and open (switch 60A opened, switch 60B opened). This gives 729 different permutations for each transmitter for providing different codes. This is shown in Table 1.

TABLE 1

TRANSMITTER ENCODING SCHEME
Trinary Encoding: Count = 0, 1, 2, Where
0 = Zero   1 = One   2 = Open
X = 0, 1 or 2; B = Battery Low Bit,
A9, The Most Significant Bit, Where
0 = Low Battery Condition and 1 = Normal Alarm

| CHANNEL | CHANNEL LABEL | 9 BIT CODE A9 ... A1 |
|---|---|---|
| 1 | CALL MEDICAL | B00XXXXXX |
| 2 | CALL FIRE DEPT. | B01XXXXXX |
| 3 | CALL POLICE DEPT. | B02XXXXXX |
| 4 | CALL AIDE | B10XXXXXX |
| 5 | CALL RELATIVE | B11XXXXXX |
| 6 | RESERVED | B12XXXXXX |
| 7 | RESERVED | B20XXXXXX |
| 8 | RESERVED | B21XXXXXX |
| 9 | RESERVED | B22XXXXXX |

As mentioned, there are 729 possible transmitter identification codes per channel which are determined by the six least significant bits (A6 through A1) represented in Table 1 above by XXXXXX. In the preferred embodiment of transmitter 12, this trinary encoding scheme is implemented with the count "0" being a grounded condition, the count "1" being a +6 volt condition, and the count "2" being a high-impedance circuit condition. Note bits A7 and A8 are used to assign the channel code 1 through 8. The channel code 9 ("22") is reserved for special purposes.

In an alternate arrangement for XMTR-ID circuit 52, each of the individual switches 60 for the three-state encoding scheme can be traces on a printed circuit board, rather than actual switches. Consequently, a combination of traces and lack of traces will provide a permanent encoding scheme for the particular transmitting unit in the field. Pins 7 and 9 are preferably hard-wired as shown to provide set encoding schemes for particular situations such as a fire or medical distress or alert.

The encoder circuit chip 51 operates at approximately 2 KHz to provide the serial coded data bit stream at pin 15. A conventional RC oscillator time base 62 establishes this oscillation rate. The oscillator circuit 62 includes resistors R4 and R5 and capacitor C6, in which resistor R4 is applied to pin 13, capacitor C6 is applied to pin 12 and resistor R5 is applied to pin 11 of the encoder chip 51, as shown, in order to establish the time constants necessary to set the desired clocking frequency of the encoder circuit 50.

Additionally, an initial reset circuit 54, made of an R-C network formed by capacitor C8 and resistor R13, is included to prevent the encoder circuit 52 from outputting the data stream before a predetermined period of time necessary to achieve a stable voltage on the encoder circuit 50 and stabilize the microtransmitter operating frequency. The capacitor C8 and resistor R13 establish a relatively small time constant to provide this function. Upon power-up, pin 14 keeps the encoder circuit chip 51 "HI" briefly, and then goes "LOW", which allows the encoder chip 51 to output the serial data stream on pin 15.

The serial coded data stream from the encoder chip 51 is applied to a conventional surface acoustic wave (SAW) resonator 66 and the base of a switching transistor 68 through a resistor R3 within the Colpitts oscillator circuit 55. An inductor L1 and capacitors C3 and C4 form a natural tank circuit which has a resonant frequency at approximately 418 MHz±200 KHz. Upon activation of the switch 48 (or of the low-voltage detected timer circuit 58), the tank circuit is provided with power from the battery 50. The n-p-n transistor 68 provides an amplifier and the SAW resonator 66 stabilizes the frequency at which the tank circuit will oscillate. There is a natural feedback loop through the base of the transistor 68, through the ground of the SAW resonator 66 and back through the capacitor C4. The use of SAW resonators and Colpitts oscillators together offers a number of advantages such as stability, small size, and durability, etc. is well known in the art. Thus, the specifics of the internal operation of the microtransmitter 55 need not be further described here. The antenna is a conventional loop antenna L1 which is preferably a conductive loop or trace on a printed circuit board containing the various electronic circuits. In this configuration, the SAW resonator 66 forces the Colpitts oscillator circuit 55 to oscillate only at the frequency of the SAW resonator 66. Capacitors C1 and C7 provide a high-frequency bypass filter which filters out spurious high-frequency signals which might otherwise cause undesired operation of or voltage spikes upon circuit 50.

Figure 3:
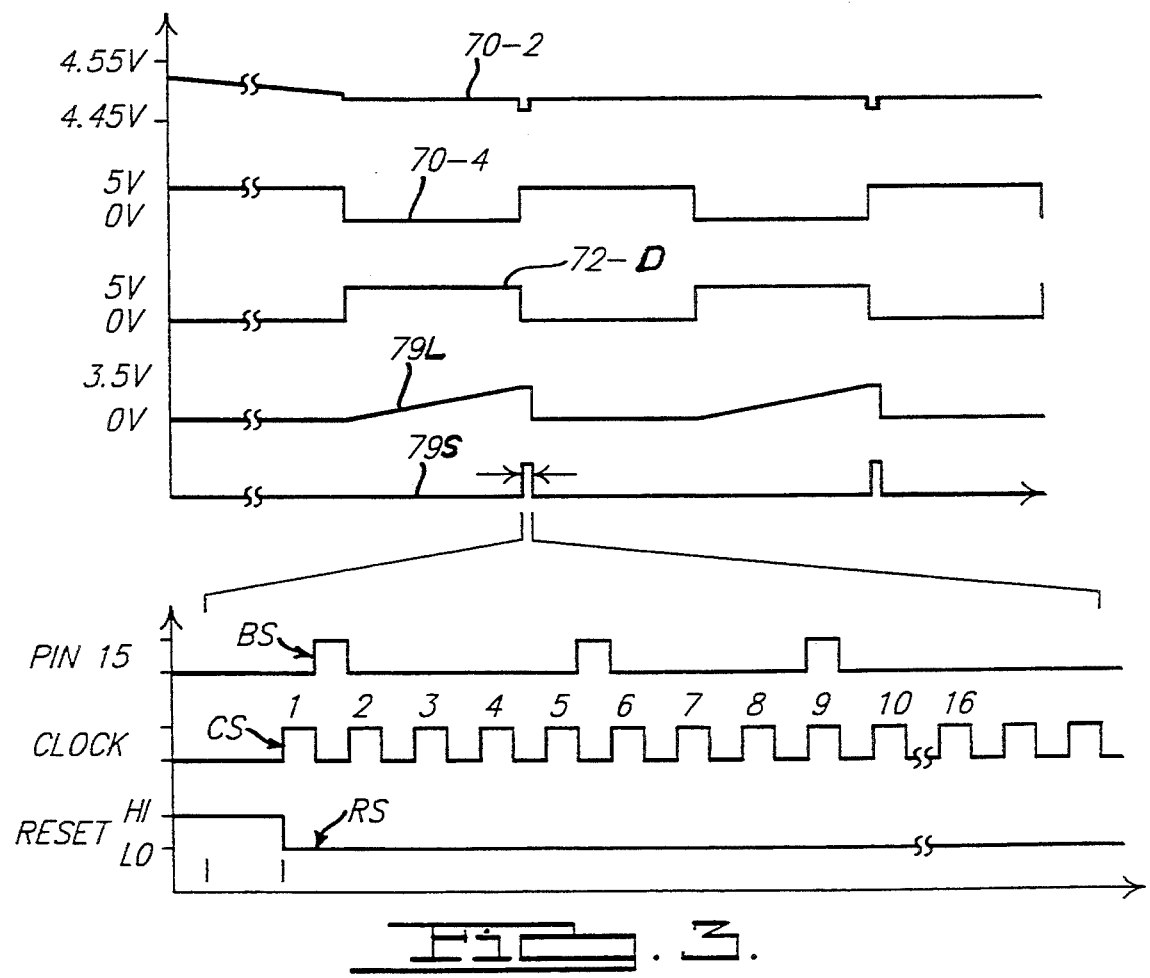
FIG. 3 is a timing diagram of the battery monitoring circuit of FIG. 1 transmitting unit, and an enlarged timing diagram of a coded radio frequency signal emitted therefrom.

As mentioned above, the low voltage detect circuit 56 enables the transmitter unit circuit 46 to emit a signal to the base unit 16 that the transmitting unit 12 is at low battery power. As shown in FIG. 2, the low voltage detect circuit 56 receives battery power regardless of whether the switch 48 has been activated. A low voltage detect chip 70, which may be a commercially available product such as MAX 8211, provides the mechanism for detecting when the battery voltage drops below a predetermined level. Battery voltage is applied to pin 8 of the low voltage detect chip 70. A capacitor C5 is incorporated for high frequency bypass to protect a resistor ladder comprised of resistors R6, R7 and R8 in order to prevent false triggering due to voltage spikes which may occur from sources such as electrostatic discharge or radio frequency interference. Pin 2 of the low voltage detect chip 70 is an input where a threshold voltage level is established relative to pin 3 by resistors R6 and R7 to determine the level of hysteresis necessary before the low voltage detect chip 70 will reset. The operation of the circuits 56 and 58 are shown in the graphs of FIG. 3. When the voltage level 70-72 drops below the threshold, an output 70-4 at pin 4 of the low voltage detect chip 70 goes from "HIGH" to "LOW", which in turn enables an FET transistor 72. When the gate terminal of the transistor 72 is low, the transistor 72 will turn on, thus providing power as shown at trace 72-D in FIG. 3 from the source to the drain of the transistor 72, and thus, to the oscillator circuit 58. A bypass capacitor C9 helps provide a stable power supply to the low voltage oscillator circuit 58.

The low voltage detect oscillator circuit 58 includes a series of Schmitt triggers on a common chip 74. Common chip Schmitt triggers are energized by the transistor 72 in a low battery mode. Schmitt trigger 76 together with R9, R12, C2 form a driving oscillator for the remaining Schmitt triggers. The bank 77 of Schmitt triggers in parallel are provided to establish the necessary fan-out for the low battery detect signal to drive the encoder circuit 50 and microtransmitter 55. When the Schmitt trigger receives a signal 72-D from the transistor 72, it provides a signal to the XMTR-ID circuit 52, which causes the encoder circuit 50 to be activated. Since the input pin 10 remains "LOW", the base unit decodes or recognizes that this is a low battery signal and not an alarm condition.

The low voltage detect oscillator circuit 58 also includes a timing device 78 including a first timing circuit formed by the combination of capacitor C2 and resistors R9 and R12. This circuit provides a time-constant in the neighborhood of 10 to 15 seconds as illustrated by waveform 79L in FIG. 3. This time constant is provided in order to meet the FCC regulation that automatically operated equipment not be able to send out signals more often than once every ten seconds. A second timing circuit is formed by the combination of capacitor C2 and resistor R10. The second time constant is on the order of 0.25 seconds, as illustrated by waveform 79S in FIG. 3. This time constant was chosen to insure that at least two complete transmissions of the serial code from the encoder chip 51 are able to be sent out once the encoder circuit 50 is switched on.

The bottom three waveforms in FIG. 3 are an expanded timing diagram which illustrates the timing relationships between the serial bit stream signal BS, the clock signal CS and the reset signal RS found on pins 15, 12 and 14 of encoder chip 51, respectively. The reset signal RS is produced by the reset circuit 64. The clock signal CS is from the time base 62, and the output at pin 15 represents a typical serial digital data bitstream. The specific logical ones and logical zeros of the serial bitstream is established by the setting of switches 60, and whether input pin 10 is "HI" or "LOW".

FIG. 4 shows a detailed block diagram of a preferred instruction for the overall circuitry 88 within the base unit 16. The overall circuitry 88 includes a microcontroller 90 with its own crystal time base 91 and serial electrically-erasable programmable read-only memory ("EEPROM") 92; a local micropowered transmitter 94, a signal conditioner/buffer 96; a power regulating and monitoring section 100 composed of an AC-to-DC regulated power supply 102; a voltage reference source 104; a battery charger section 106 and battery 108, an AC line fail monitor 110 and a low voltage battery monitory 112. The circuitry 88 also includes connections 120 to a telephone 122 controlled by a telephone line seize device 124 having an electromechanical relay 126 with contacts 128 operated by a relay driver 130. The phone line 132 from the relay contact section 128 leads to an isolation transformer 136 connected to a buffer/filter section 138 leading to a modem chip 140, all of which constitute a modem interface section 142. The telephone line 134 from relay contact section 128 leads to a pulse dial circuit section 144 having a relay 146 and relay driver circuit 150.

The overall circuit 88 also includes a dial tone detector circuit 154, a power saver device 158 and a dual-tone multiple frequency ("DTMF") generator circuit 160.

The base unit circuitry 88 also includes a receiver section 170, which has a loop antenna 172 which receives the transmitted signals and passes them to a superregenerative receiver section 174. The section 174 includes a first stage amplifier 175 connected to antenna 172, a second stage amplifier 176 and a 418 MHz oscillator 177. The superregenerative receiver section 174 also includes a quench oscillator 178 connected to the various stages and the high frequency 177. The output of the high frequency oscillator 177 is provided to a demodulator section 180 including a demodulator circuit 185 which feeds a filter section 186, whose output is boosted by amplifier 187 so that a demodulated signal is output on line 188.

The overall circuitry 88 also includes an audio section 200 which receives digital input on line 202 that is successively conditioned by first and second stage filters 204 and 206 before being applied to 208 to pass the filtered audio signal to a power audio amplifier 210 which drives a speaker 32 via line 21 2.

The circuitry 88 also includes a conventional input buffer circuit 220 which conditions input signals received from keypad section 222 over multiple conductors 224. The program button 28 also goes into the input buffer section 220. A watchdog timer circuit 226 is provided to monitor proper operation of the microcontroller 90. A circuit section 228 is provided to drive the power on LED 26 and includes a LED driver 230.

Overall circuitry 88 may optionally include a caller identification circuit section 240, which monitors the caller identification codes now provided by the public phone companies on incoming calls between the first and second rings. The phone signal PH is provided from the secondary winding device of isolation transformer 136 along line 246.

The overall circuitry 88 of base unit 16 may also include an alphanumeric display driver section 250 which operates the alphanumeric display 24.

Armed with this overview, the specific components within the base unit circuitry 88 may now be explored.

The microcontroller 90 includes microprocessor 260, random access memory ("RAM") 262 and read-only memory ("ROM") 264 which is addressed through chip select/address circuitry section 266 over common internal bus 270 which typically will include data, address and control lines. The microcontroller 90 also includes an interrupt section 272 which can provide an external interrupt signal along line 274 to the microprocessor 260. The microcontroller 90 also includes various input/output ("I/O") section 276, 278, 280 and 282 which are addressed through the common internal bus 270. The I/O ports 276–282 in the present invention may all be digital since no analog output is needed, since various other circuits can convert the digital outputs from these I/O ports into analog signals as needed, as will be explained shortly.

Almost all of the individual circuits and sections shown in FIG. 4 are preferably of standard off-the-shelf design for economy, but can obviously be custom built if manufacturing volumes warrant such effort. Those lines in FIG. 4 through which a diagonal hash mark has been placed, such as line 224 between the keypad 222 and input buffer 220 represent multiple conductors.

Armed with the foregoing overview, the construction and operation of the individual circuits of base unit 16, as shown in FIGS. 5A through 5F will now be explained.

The FIGS. 5A–5F represent the overall circuitry 88 of the base unit 16. For clarity, the circuit 88 has been separated into six individual figures on five separate pages. Connection lines between the individual components of these different FIGS. 5A–5F are represented by common reference letters (a) through (t).

Figure 5A:
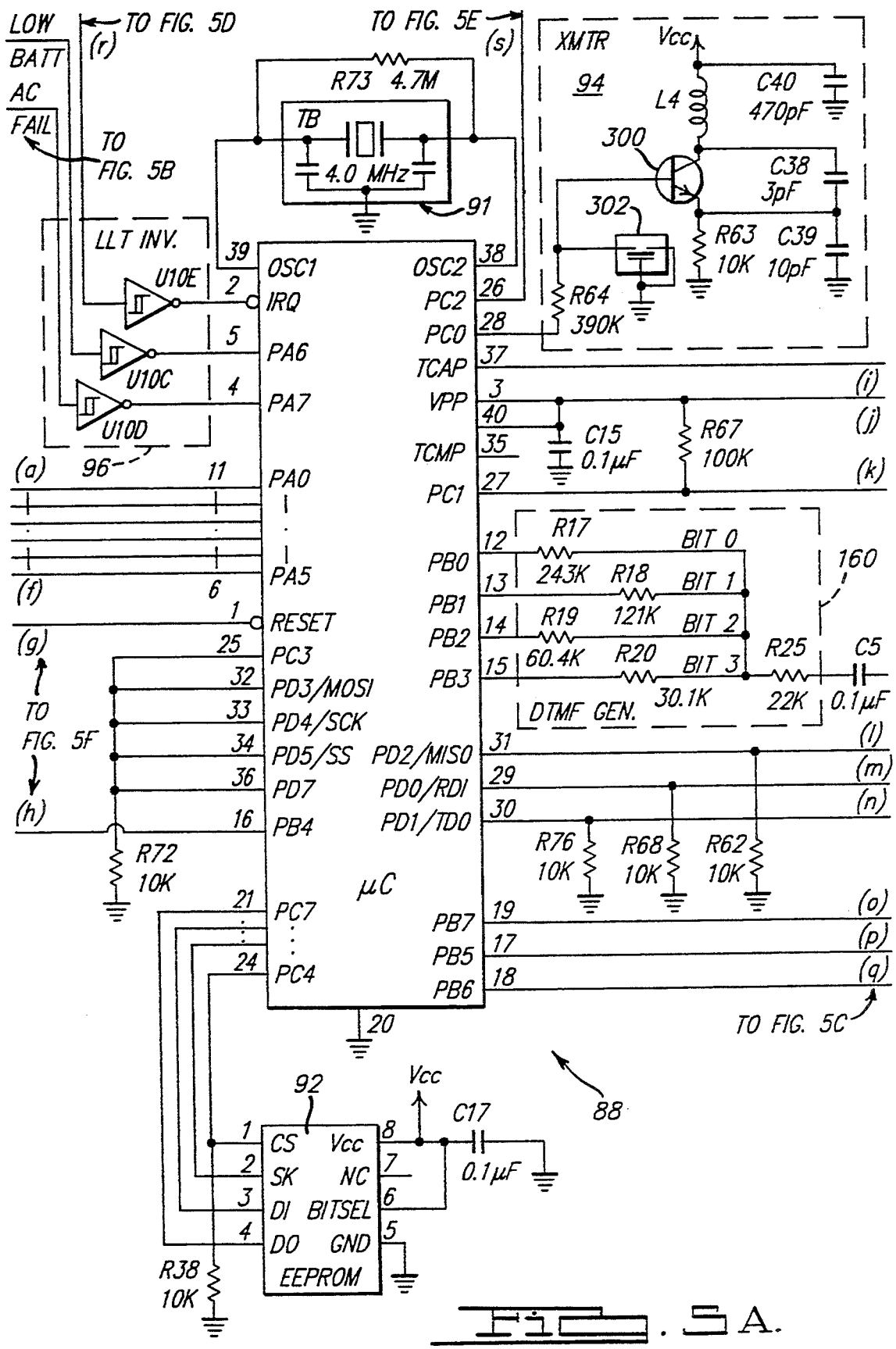
FIGS. 5 consists of FIGS. 5A through 5E, which together comprise a schematic diagram of a preferred version of the base unit of FIG. 1.

Turning to FIG. 5A, a microcontroller 90 is shown representing the control portion of the circuit 88. The microcontroller 90 is preferably any applicable commercially available microcontroller, such as a Motorola MC68HCO5C8P, whose operation is well understood to those skilled in the art. The microcontroller 90 has 40 output and input pins, as shown, which are connected to the various components of the circuit 88, as will be discussed in greater detail below. A 4.0 MHz crystal 91 is applied to pins 38 and 39 of the microcontroller 90 in order to establish the operating frequency of the circuit 88.

Pins 25, 32, 33, 34 and 36 are input pins through which a caller identification (ID) can be established for the microcontroller 90. Caller ID chips which monitor incoming telephone signals between first and second telephone rings have recently become well-known and commercially available. Between the first and second ring, a serial digital transmission of information is sent which includes the phone number of the caller, which in this case typically might be from the monitoring station 18. The output of the caller ID chip 240 is a serial data stream which is directly provided to the microcontroller 90. The microcontroller 90 will decode serial information from the caller ID chip 240 in a desired manner. Those in the art will appreciate that this personal monitoring system can be pre-programmed through a modem with a series of telephone numbers that the base unit 16 is able to recognize. Therefore, the base unit 16 can, upon receipt of any incoming call, determine whether the call is one which is recognizable when compared against the internal table. If a match is found, an appropriate message can be provided on the alphanumeric display 24, such as "Son Calling From His Office". In this manner, the personal monitoring system 10 can be used to monitor incoming calls. This, in turn, provides the user with an increased sense of security, since the user need not answer a call from a stranger. Also, if desired, the monitoring system can be pre-programmed to speak a message upon recognizing a particular call, such as "Your Daughter Alice Is Calling" or any other message which might be appropriate.

In a first prototype of system 10 of the present invention, the base unit 16 uses a relatively small sized commercially available non-volatile electrically erasable programmable read-only memory (EEPROM) chip 92, which provides stored data in 16-bit words to pins 21-24 of the microcontroller 90. The EEPROM chip 92 will store phone numbers and other critical information, such as transmitter identification codes, software revision levels, serial numbers and any other desired information such that when the microcontroller 90 receives information by the caller ID chip 240, the microcontroller 90 will verify that the coded signal received was, in fact, one in which the microcontroller 90 was meant to recognize.

The buffer section 96 in the prototype unit 16 are a series of Schmitt triggers, provided on a common chip in which three of the Schmitt triggers are applied to pins 2, 4 and 5 of the microcontroller 90. The Schmitt triggers act as inverting logic level translators which provide one of either a zero or viable logic level to the microcontroller 90 upon receipt of a voltage signal on an AC fail line, a low battery line or an input line 188 from the receiver section 170. All these signals will be discussed in greater detail below.

A signal from an on-board transmitter 94 is connected at pin 28 of the microcontroller 90. The transmitter 94 operates identically to the Colpitts oscillator 55 above. As such includes an amplifying transistor 300 and a SAW resonator 302. The transmitter 94 enables the microcontroller 90 to generate a radio frequency signal in order to test the receiver circuitry to ensure that it is operating. This test procedure is performed intermittently, preferably at start up, and when the user presses the test switch 22T discussed above. Additionally, the microcontroller 90 can be programmed to automatically perform self tests at predetermined scheduled intervals.

The DTMF generator circuit 60 includes resistors R17-R20 connected at pins 12-15, respectively, which provides scaled digital outputs from the microcontroller 90 having a 16-bit resolution. Thus, pins 12-15 produce a step-wise digital signal which models an analog waveform. This analog waveform is level shifted (i.e., AC coupled) by capacitor C5 and is applied to the modem circuit 142 (discussed more fully below) which transfers and limits the resulting signal to be within FCC specified power levels. Thus, it will be appreciated that the DTMF circuitry 160 provides the desirable DTMF signals for dialing out purposes.

Figure 5B:
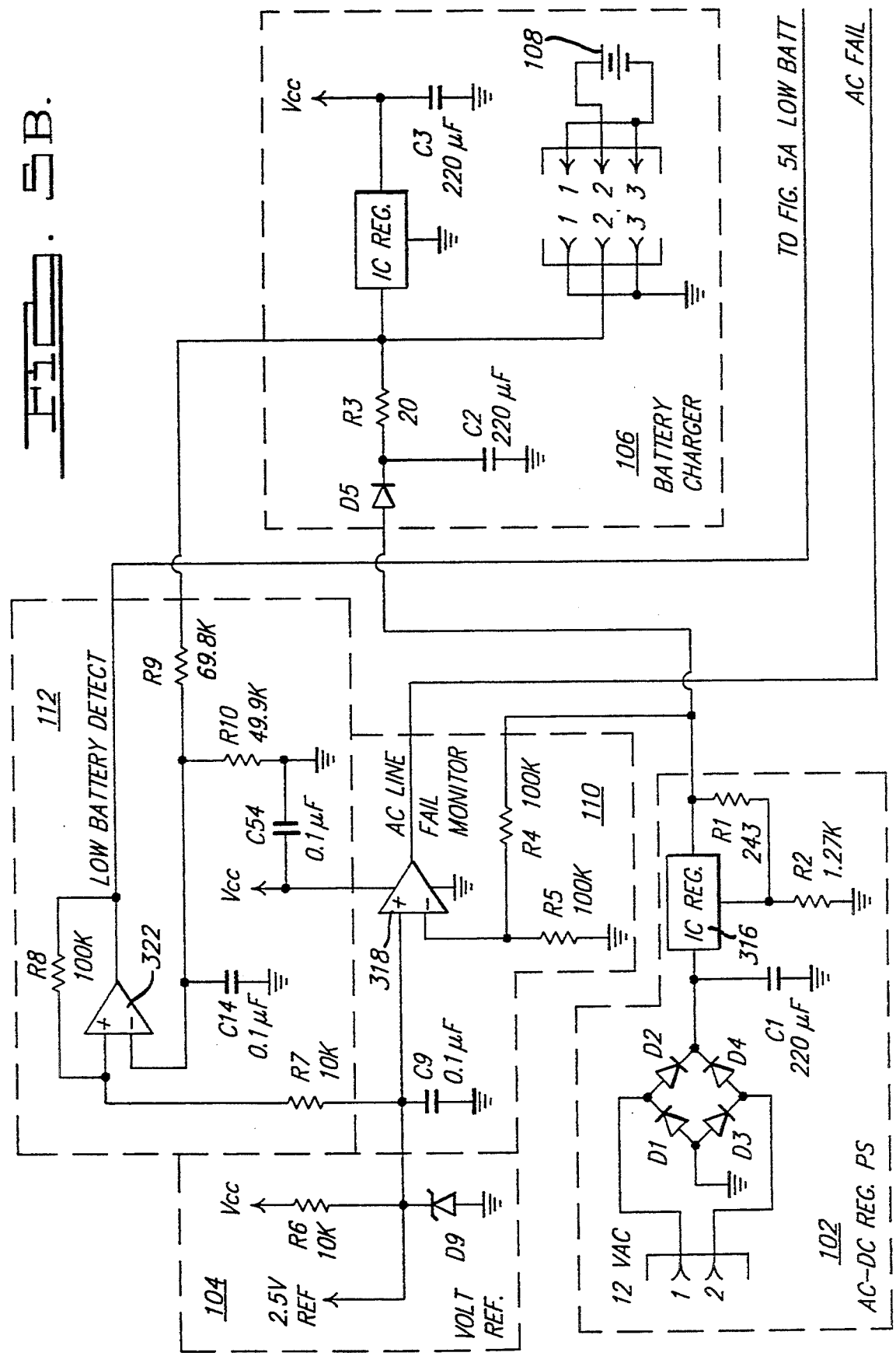

FIG. 5B illustrates a preferred design AC-to-DC regulating power supply 102, a battery charging circuit 106, and a low battery voltage monitor circuit 112. The power supply circuit 102 converts 12 volts AC (which is preferably obtained from a UL-listed 120V to 12V transformer package) to a DC voltage by applying the 12 volts AC to a bridge rectifier comprised of diodes D1, D2, D3 and D4. The DC voltage from the bridge rectifier is then applied to a voltage regulator chip 316. Capacitor C1 acts as a filter. The output of chip 316 is applied to the negative input of an operational amplifier 318 within the low battery voltage circuit 112. The operational amplifier 318 compares the DC voltage from the power regulator circuit 102 with a reference voltage at the positive terminal, and when the AC voltage is interrupted and falls below a predetermined threshold, an output of the operational amplifier 318 is applied to the microcontroller 90 as an AC fail signal at pin 5 through one of the Schmitt triggers of the Schmitt trigger circuit 96.

Additionally, the low battery voltage circuit 112 monitors low battery power in the event the AC fails for a long length of time. When the power is applied to the base unit 16, the battery 108 associated with the battery charger circuit 106 is continuously being charged. Upon failure of the AC power, the operational amplifier 318 will indicate an AC fail and the overall circuit 88 will be powered by the battery 108. An operational amplifier 322 will monitor the battery voltage from the battery 108, and will indicate a low battery signal at its output when the battery power falls below a predetermined interval as determined by resistors R9 and R10.

Figure 5C:
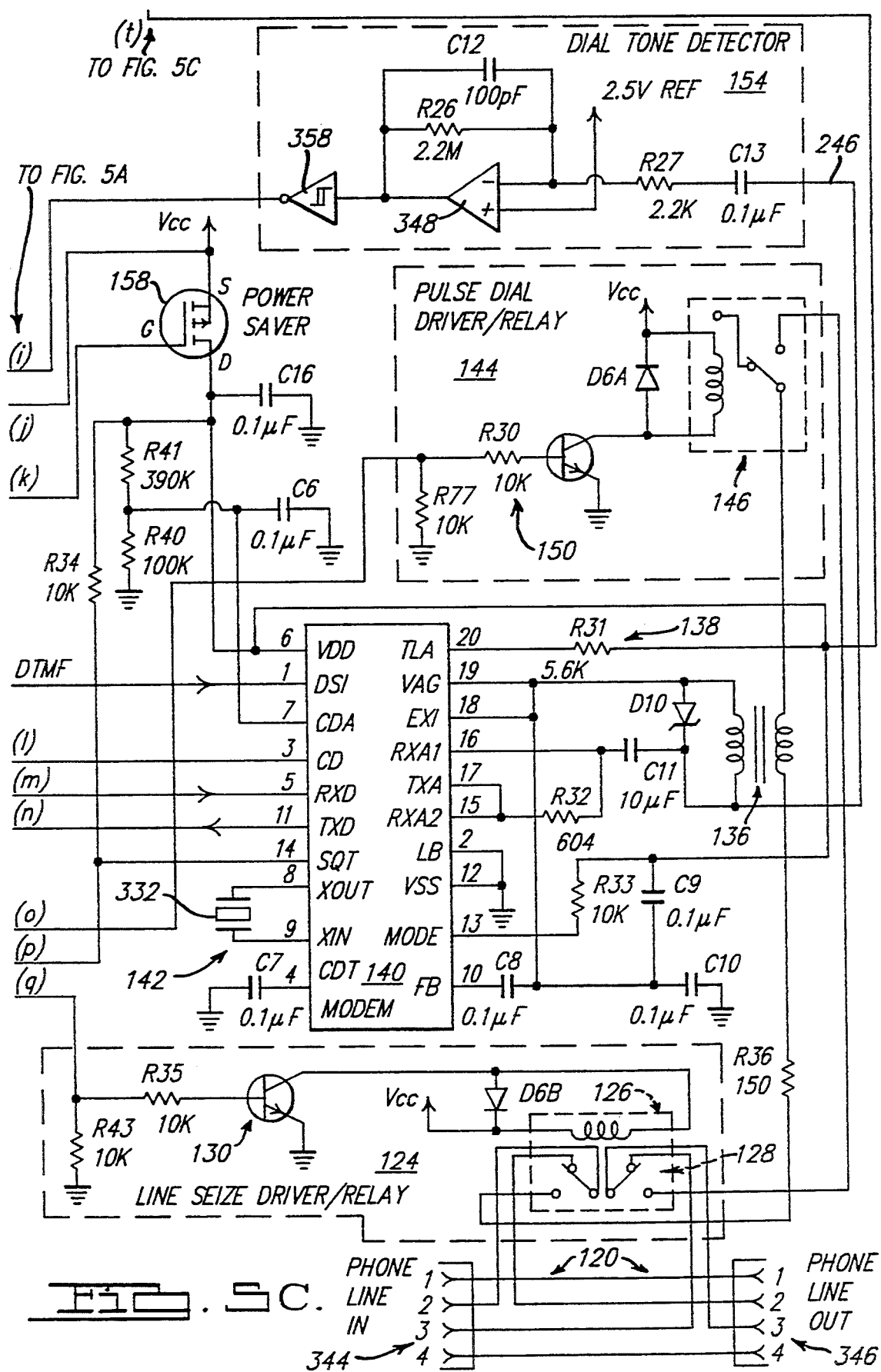

Now turning to FIG. 5C, a modem circuit 142 is shown which includes modem chip 140 that receives the DTMF signal from the microcontroller 90 along with a series of control and data signals on lines (l), (m), (n), and (p) sent from or received by pins 31, 29, 30 and 17 of the microcontroller 90, respectively. The modem chip 140 provides the DTMF telephone dialing link to the telephone line for the base unit circuit 88. It also provides the modem communications link for reprogramming. A crystal 332, applied to pins 8 and 9 of the modem chip 140 provides a 3.579 Mhz operating frequency for the modem chip 140.

In order to enable the base unit 16 to unrestrictedly provide the necessary outgoing calls upon an distress or alert situation, a line-seize relay module 124 is provided. The line-seize relay 124 enables the base unit 16 to be interposed between the telephone lines going into a telephone and the user's telephone lines going to the commercial phone system. In other words, the base unit 16 is able to seize the telephone line even if the user is attempting to make a personal call. The phone line from the telephone system is connected to a phone line-in jack 344 and is then transferred to a phone line out jack 346. A relay 126 is utilized to switch between normal use and overriding use by the base unit circuit 88 from a signal through a switching transistor 130 supplied by the control signal from pin 18 of the microcontroller 90.

Additionally, a pulse-dial relay circuit 144 is provided which will be activated in order to provide an alternate technique for the base unit 16 to place a call to the monitoring station 18. The slower pulse dial protocol is preferably used alternately with faster DTMF dialing technique to provide two methods of dialing, which should increase the probability the call will get through. A relay 146 is activated by a switching transistor driver by a control signal on line (o) from pin 19 of the microcontroller 90. Relay 136 and then relay 126 will be activated by the microcontroller 90, in order to connect the phone line using pulse-code dialing to the central station 18.

A dial tone detect circuit 154 is provided in order to allow the microcontroller 90 to recognize the type of activity on the phone lines 120. Detect circuit 154 converts the dial tone frequency to a square wave. This is accomplished by an operational amplifier 348 and a Schmitt trigger 358 whose output is connected to line (i) from pin 37 of the microcontroller 90. Capacitor C1 provides a filter for the operational amplifier 348 and resistors R27 and R26 provides the gain ratio.

The power saver device 158 is preferably simply a power field effect transistor (FET). It is provided in order to switch off the power to the modem chip 140 and the power amplifier 210 of the audio section 200 in order to preserve battery power when the base unit 16 is simply standing by.

FIG. 5D illustrates a preferred circuit for implementing the receiver section 170 to provide the signal from the transmitter 12 at 418 MHz. The receiver section 170 includes a series of switch-on transistors receiving a signal from an antenna 172 in order to provide a dual stage receiving unit. The dual stage receiving unit is comprised of a first transistor 362 which switches on when a signal is received at antenna 172. Once the transistor 362 is switched on, then a transistor 364 is switched on. An output is provided at an operational amplifier 187 to pin 2 of the microcontroller 90.

Turning to FIG. 5E, shown is a preferred circuit for the audio section 200 in order to provide an audible voice message. A digital signal representing a desired sound patten sampled at above the Nyquist rate is provided out of pin 26 by the microcontroller 90, and is applied to an operational amplifier 382 through a series of capacitors and resistors of the audio section 200. The audio section 200 is divided into three stages, a first stage integrating filter 204, a second stage filter 206, and a power audio amplifier 210. The first stage filter consists of the operational amplifier 382 providing a filtered signal through AC coupling capacitors and filtering capacitors C41, C42 and C43 and resistors R66 and R69. The output from the operational amplifier 382 is applied to the second stage filter 206 which consists of capacitors C45 and C50 and resistors R70, R75 and R28. A signal on line 208 from the second stage filter 206 is applied to the power audio amplifier 210, specifically to the positive input of an high power operational amplifier 384. The first stage filter receives the original square wave digital signal and converts it to a triangular waveform with rounded vertices. The second stage filter filters this signal to more closely approximate a clean analog signal suitable for power amplification. The power amplification stage provides the power necessary to drive a speaker circuit 386, including speaker 32. The capacitor C44 is a bypass capacitor to stabilize the operation of the operational amplifier 384.

Figure 5F:
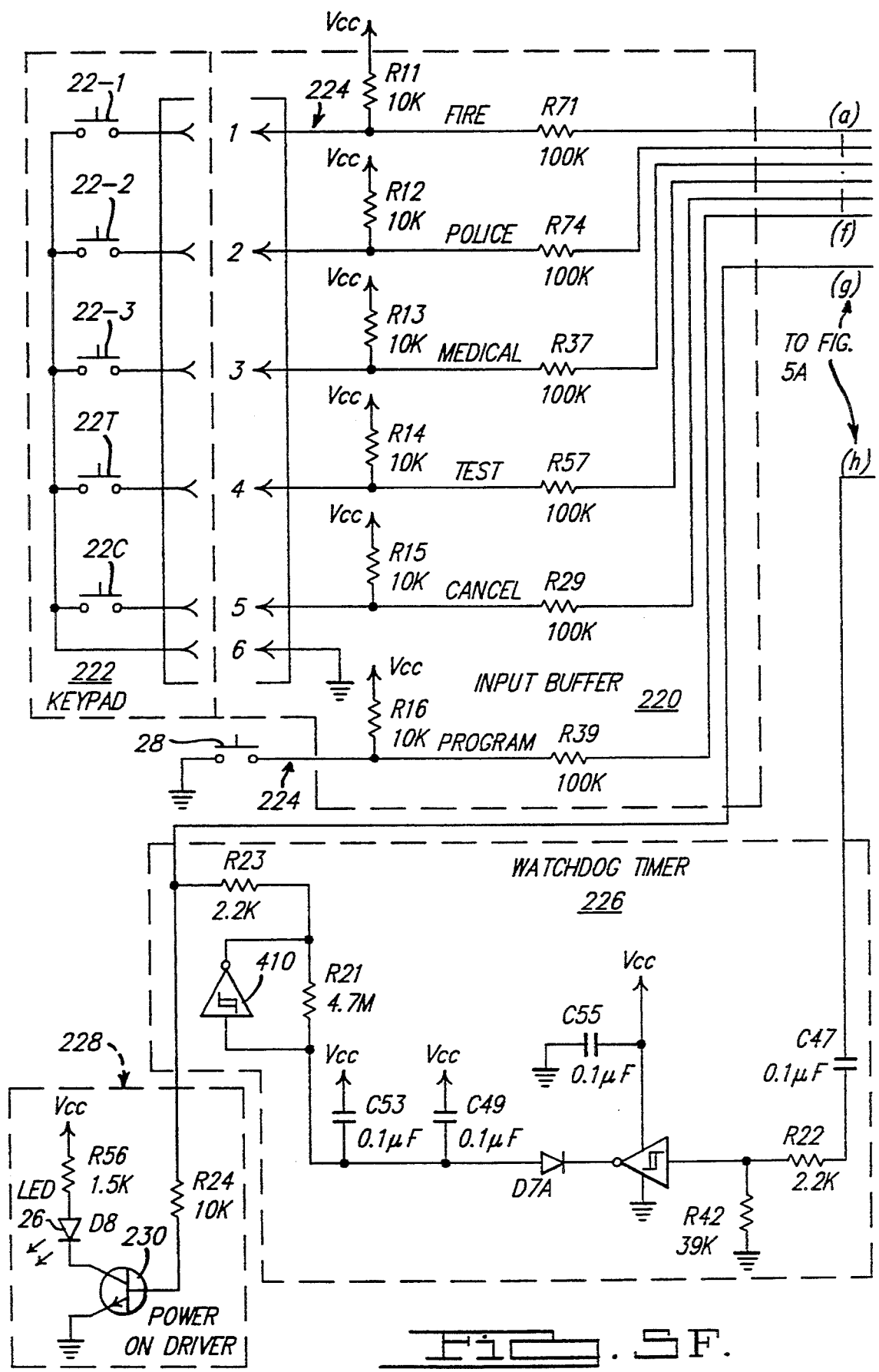

FIG. 5F shows one implementation for keypad section 222 which is brought out external to the cover 21 of the base unit 16. The keypad section 222 includes a series of pushbutton switches 22, here five, which automatically signal a particular distress or alert condition when they are pressed. In this particular embodiment, switches 22 include a fire alert switch 22-1, a police alert switch 22-2, a medical alert switch 22-3, a test switch 22T and a cancel switch 22C. The numeric keypad 23 may also be included for the entry of a personal ID in order to turn on or off certain channels as mentioned above. Such a programming feature may be applicable when arming the system when leaving a residence for protection against break-ins or other breach of security. A series of pull-up resistors R11-R15 are connected to each of the switches 22 and a high signal in order to ensure that the input signal lines remain high except when a particular switch 22 is depressed. A program pushbutton switch 28 is provided in order to signal to the monitoring station 18 that programming is required. When the program pushbutton switch 28 is activated, the signal on the program line is pulled low, thus allowing the microcontroller 90, to be reprogrammed through the modem chip 140 by the monitoring station 18. Consequently, when the pushbutton program switch 28 is activated, the EEPROM 92 will be reprogrammed by the circuit 90 for a set period of time. Each of the resistors R71, R74, R37, R57, R29 and R39 provide protection for electrostatic discharge.

In order to monitor whether the microcontroller 90 is operating correctly, a watchdog timer circuit 226 is included. The watchdog timer circuit 226 includes an RC circuit formed by resistor R21 and capacitors C53 and C49. This RC circuit turns a Schmitt trigger 410 on and off approximately two to four times per second in order to control an LED output circuit 228 including an LED 26 also to pull the microcontroller 90 into reset to restart the program properly. If the microcontroller 90 is running, a reset signal is not applied to pin 16 of the microcontroller 90 and the LED 26 will be lit continuously. The watchdog timer circuit 226 will then be on standby, as long as the microcontroller 90 is operating properly and continues to pet the watchdog circuit 226. If this petting action should stop, the Schmitt trigger 410 provides a signal to the LED 26 through a switching transistor 230, which causes the LED 26 to blink at the time constant of the RC circuit. Consequently, the LED 26 will blink only when the microcontroller 90 is down but the power is up. This blinking light in turn is a signal to the subscriber that the base unit 16 is not ready to operate, but instead requires service.

Armed with the foregoing technical description, those skilled in working with microcomputers will readily be able to program the microcomputer 90 to perform as indicated above. Further, the particular sequences can be altered so as to service different I/O ports at different times, but still achieve the overall results desired by this unit. Accordingly, there is no need to discuss the programming of this system beyond the following note. When a demodulated input signal is received on line 188, it is passed through the input buffer 96 to the interrupt section 272 of the microcontroller 90. Given that the clock frequency of the serial digital signals encoded upon the 418 MHz carrier frequency is 2 KHz, it is a relatively easy matter for the microcontroller 90 to be programmed to measure the time intervals between interrupts. Then, using autocorrelation techniques, the microcontroller 90 can easily determine when a valid code has arrived. Further, to ensure that a spurious reading has not been obtained, the microcontroller 90 may be programmed to require two (or more) identical serial signals be received within a specified period of time before such a demodulated serial signal is recognized as a valid signal. The codes which arrive could be stored in registers or RAM and compared with one another so that up to eight input devices transmitting within a relatively short time can be successfully distinguished from one another.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A programmable personal monitoring system for monitoring one or more conditions in a predetermined local area using at least one wireless microtransmitter and a radio-receiving base unit and providing a communications link to a central monitoring station, the system comprising:
    (a) at least one wireless battery-operated transmitter unit sized to be easily portable by one hand and operable to transmit, at a predetermined high frequency, a first coded signal indicative of an external condition of a first predetermined type outside of the transmitter unit and a second coded signal indicative of a low-battery condition within the transmitter unit, the one transmitter unit including
        (1) a micropower transmitter for generating a high frequency pulse-modulated signals in response to a serially encoded digital control signal,
        (2) an encoding circuit for providing first and second predetermined serially encoded digital control signals, the encoding circuit including first means for encoding programming into each of the digital control signals a unique transmitter identification ("XMTR-ID") code associated with the one transmitter unit, and one of first and second condition codes respectively indicating an external condition and a low battery condition,
        (3) a low voltage detector circuit connectable to a battery used to power the one transmitter unit for providing a warning signal indicative of battery voltage dropping below a certain level, and
        (4) a timing circuit for providing an intermittent timed signal to the encoding circuit upon receipt of the warning signal from the detector circuit to automatically cause the encoding circuit to include in the next digital control signal to be transmitted the condition code indicating a low battery condition; and
    (b) a base unit for providing a communications link to a monitoring station, including
        (1) a receiver for receiving high frequency signals from the one transmitter unit, when the one transmitter unit is within a predetermined range of the base unit, and for obtaining from the high frequency signals the digital control signals encoded in the high frequency signals,
        (2) a programmable microcontroller for deciphering from the received digital control signals the XMTR-ID codes and condition codes contained therein, and for validating the deciphered XMTR-ID codes and condition codes,
        (3) means for short-term storage of validated information deciphered from at least the high-frequency signal most recently received,
        (4) means for long-term storage of information including a base identification ("BASE-ID") code uniquely identifying the base unit and a phone number to be dialed,
        (5) means for generating telephone dialing signals for transmission to telephone system lines, said means for generating telephone dialing signals including a dual-tone multi-frequency (DTMF) circuit means for providing DTMF signals in response to signals from the programmable microcontroller and a pulse-dial relay circuit means for generating pulse-code telephone signals to apply to the telephone lines, said DTMF signals and said pulse-code signals being used in combination to provide alternate methods of accessing the telephone lines so as to increase the probability that the base unit can contact the central monitoring station,
        (6) means for automatically establishing a communications link-up to the monitoring station once telephone equipment at the monitoring station responds to the telephone dialing signals, and
        (7) means for transmitting to the monitoring station from the base unit the BASE-ID code, and selected validated information stored in the means for storage.

2. The monitoring system according to claim 1 wherein, in the transmitter unit, the encoder circuit has an encoder chip and plurality of programmable circuit elements operable to set the XMTR-ID code, each of the circuit elements having at least two states.

3. The monitoring system according to claim 1 wherein, in the transmitter unit, the micropower transmitter means includes a Colpitts oscillator circuit having a surface acoustic wave resonator operable to stabilize high-frequency pulse-modulated signals having a center frequency between 300 MHz and 1000 MHz, the coded signals having a 3 dB bandwidth of less than about one percent of the center frequency.

4. The monitoring system according to claim 3 wherein, in the transmitter unit, the center frequency is between 400 MHz and 450 MHz, and the 3 dB bandwidth of no more than about one-quarter of one percent of the center frequency.

5. The monitoring system according to claim 1 wherein the base unit further includes:
    (8) means for entering personal codes to select which of a plurality of channels are to be operational or non-operational.

6. The monitoring system according to claim 1 wherein the base unit further includes:
    (8) an operator interface panel, and
    (9) switch means, mounted on the panel and including a plurality of switches, for a user to manually indicate, by actuating the switches, different predetermined local conditions, and identified by legends adjacent the switches.

7. The monitoring system according to claim 6 wherein, in the base unit, the switch means includes first, second and third switches respectively associated with predetermined sources of assistance selected from a group of sources consisting of medical personnel, municipal fire/police department personnel, private security personnel, neighbors, and relatives.

8. The monitoring system according to claim 1 wherein the base unit further includes:
(8) program switch means for, when operated, enabling access to at least certain predetermined locations of the memory of the base unit by the monitoring station, whereby the monitoring station is allowed to reprogram at least a plurality of selected operating characteristics of the base unit.

9. The monitoring system according to claim 1 wherein the base unit further includes:
(8) communication means for providing voice messages to a user at the base unit, when communications between the base unit and the monitoring station is established.

10. The monitoring system according to claim 1 wherein the base unit further includes:
(8) means for providing a visual representation of a particular distress or alert condition depending on the encoded signal received by the base unit.

11. The monitoring system according to claim 1 wherein the base unit further includes:
(8) a cancel switch and an associated cancel circuit operable to generate a cancel signal along the communications link upon activation of the cancel switch.

12. The monitoring system according to claim 1 wherein the base unit further includes:
(8) a test circuit means for testing at least the receiver of the base unit upon receipt of a test signal.

13. The monitoring system according to claim 12, wherein the test circuit means further includes a local transmitter within the base unit for transmitting at a predetermined high frequency pulse modulated signals in response to serially encoded digital control signals.

14. The monitoring system according to claim 5, wherein the means for entering personal codes is a keypad mounted on the base unit.

15. In a personal monitoring system for monitoring one or more conditions in a predetermined local area using a radio-receiving base unit and providing a communications link-up to a central monitoring station, a wireless battery-operated transmitter unit for generating high-frequency radio-frequency signals at a predetermined frequency, comprising:
(1) a housing which is easily portable by one hand for containing other portions of the transmitter unit;
(2) micropower transmitter means for transmitting, at the predetermined high frequency, first and second pulse-modulated coded signals respectively indicative of an external condition of a first predetermined type outside of the transmitter unit and a low-battery condition within the transmitter unit, the transmitter means generating the high frequency pulse-modulated signals in response to serially encoded digital control signals;
(3) encoding means for providing first and second predetermined serially encoded digital control signals, the encoding means including first means for programming into each of the digital control signals a unique transmitter identification ("XMTR-ID") code associated with the one transmitter unit, and one of first and second condition codes respectively indicating an external condition and a low battery condition;
(4) low voltage detect circuit means, connectable to a battery used to power the one transmitter unit for providing a warning signal indicative of battery voltage dropping below a certain threshold level; and
(5) circuit means for providing an intermittent timing signal to the encoding means and the transmitter circuit means upon receipt of the warning signal from the detect circuit means to automatically cause the encoding means to include in the next digital control signal to be transmitted the condition code indicating a low battery condition, wherein the low voltage detect circuit means is continually being powered by the battery and the micropower transmitter means, the encoding means and the circuit means for providing an intermittent timing signal are only activated when the transmitter unit is operational to transmit a signal.

16. The transmitter unit of claim 15, wherein the encoding means includes an encoder chip and plurality of programmable circuit elements operable to set the XMTR-ID code, each of the circuit elements having at least two states.

17. The transmitter unit of claim 15, wherein the micropower transmitter means includes a Colpitts oscillator circuit having a surface acoustic wave resonator for stabilizing high-frequency pulse-modulated signals having a center frequency between 300 MHz and 1000 MHz, the encoded signal having a 3dB bandwidth of less than about one percent of the center frequency.

18. The transmitter unit according to claim 15 wherein the center frequency is between 400 MHz and 450 MHz, and the 3 dB bandwidth is of no more than about one-quarter of one percent of the center frequency.

19. The transmitter unit of claim 15, further comprising:
(6) initial reset circuit means for preventing the encoding means from outputting the encoded digital signal before a predetermined period of time necessary to achieve a stable voltage on the encoding means; and wherein
the encoding means further includes second means for programming into every one of the digital control signals from the one transmitter unit one of at least eight possible channel codes, whereby the one transmitter unit is associated with one predetermined condition selected from a group of possible predetermined conditions.

20. The transmitter unit of claim 15, wherein the low voltage detect circuit means is arranged to constantly receive battery power, and includes output means, including a field effect transistor ("FET") switch, for providing electrical power to other portions of the transmitter unit through the FET switch when a low battery voltage condition drops below the threshold level.

21. In a monitoring system for monitoring possible distress or alert situations detected and signaled by wireless transmitter units that transmit pulse-code low-power radio signals at a common high frequency and communicate the radio signals to a remote central monitoring station via a telephone communications link, a base unit for receiving and deciphering the coded low-power radio signals and automatically establishing a telephone communications link between the base unit and the monitoring station, said base unit comprising:

- microcomputer means for controlling the operation of the base unit, said microcomputer means including a non-volatile erasable programmable read-only memory that stores transmitter identification codes of the transmitter units;
- dual-tone multiple-frequency (DTMF) generator circuit means for providing DTMF signals so as to enable the microcomputer means to communicate with telephone lines;
- modem means for interfacing the base unit with the telephone lines, said modem means being connected to the DTMF circuit means so as to enable programming of the base unit remotely over the telephone line;
- line-seize relay means for seizing a telephone line for use by the base unit in the event the telephone line is being used for another purpose;
- battery circuit means for applying electrical power from a battery to the base unit in the event that AC power is interrupted, the battery circuit means including a battery charger section that charges the battery when AC power is being received by the base unit;
- low battery monitoring circuit means for monitoring a low electrical power condition of the battery and providing a signal indicative of the low battery power;
- receiver circuit means for receiving pulse-coded signals from each of the transmitting units and providing decoded signals to the microcomputer means indicative of these signals;
- an interface section operable to provide a user interface to the microcomputer means, the interface section including a plurality of manual input devices;
- audio circuit means for providing an audible audio signal at the base unit in response to a message received from the monitoring station over the telephone lines, the audio circuit means being responsive at least in to commands received through the modem circuit means from the monitoring station; and
- power saver means for reducing electrical power to the modem chip means and the audio circuit means in order to preserve battery power when the base unit is in a standby mode waiting for incoming signals.

22. In a programmable monitoring system for monitoring possible distress or alert situations detected and signalled by wireless transmitter units sending pulse-code low-power radio signals at a common high frequency and communicating same to a remote central monitoring station via a telephone communications link, a base unit for receiving and deciphering the coded low-power radio signals and automatically establishing a communications link between the base unit and the monitoring station, the base unit comprising:

(a) microcomputer means for controlling the operation of the base unit, the microcomputer means including a series of input and output ports for electrical connection to additional circuitry of the base unit, the microcomputer means further includes a non-volatile erasable, programmable read-only memory chip which stores at least transmitter identification codes of the transmitter units;

(b) telephone signal generation means for providing telephone dialing signals to telephone lines of a telephone system, said telephone signal generation means including dual-tone multi-frequency (DTMF) circuit means for providing DTMF telephone signals in response to signals from the microcomputer means and pulse-dial relay circuit means for generating pulse-code telephone signals to apply to the telephone lines, said DTMF signals and said pulse-code signals being used sequentially in combination to provide alternate methods of accessing the telephone system so as to increase the probability that the base unit can contact the central monitoring station;

(c) modem means for interfacing with a telephone system, the modem means being connected to the DTMF circuit mean in order to enable programming of the base unit remotely over the telephone system;

(d) line-seize relay means for seizing the telephone lines for use by the base unit in the event the telephone lines are being used for another purpose;

(e) battery circuit means for applying battery power from a battery to the base unit in the event that AC power is interrupted, the battery circuit means including a battery charger section which charges the battery when AC power is being received;

(f) low battery monitoring circuit for monitoring low battery power of the battery and providing a signal indicative of low battery power;

(g) receiver circuit means for receiving pulse-coded signals from each of the transmitting units and providing decoded signals to the microcomputer means indicative of this signal;

(h) an interface section associated with the base unit for providing a user interface to the microcomputer means, the interface section including a plurality of manual input devices; and (i) audio circuit means for providing an audible signal in response to a message received from the monitoring station via the telephone link, the audio circuit means responsive to the modem circuit means for providing the signals from the monitoring station.

23. The base unit as in claim 22, further comprising:
(j) watchdog timer circuit means for determining whether the microcomputer means is functioning; and
(k) local alarm means for providing an indication that the watchdog timer circuit means has detected whether the microcomputer means is functioning.

24. The base unit as in claim 22, further comprising:
(j) caller identification means for monitoring incoming telephone signals, and deciphering therefrom a telephone number associated with the incoming signals; and
(k) visual readout for displaying the telephone number associated with the incoming signals.

25. The base unit as in claim 22, wherein:
the receiver circuit means includes an oscillator for recreating the frequency of the received signal and a surface acoustic wave delay line for stabilizing the frequency of the recreated frequency.

26. The base unit as in claim 22, wherein:
the interface section includes a series of pushbutton switches; and a cancel switch for generating a cancel signal received by the microcomputer means, whereby the communications link between the base unit and the central monitoring station is canceled.

27. The base unit as in claim 22, further comprising:
(j) input means for selectively activating a self-test function within the base unit; and
(j) local micropower transmitter means for generating a test radio signal at the common high frequency used by the wireless transmitter units, and receivable by the receiver circuit means.

28. The base unit as in claim 22, further comprising:
(j) input means for selectively activating a reprogramming function which enables at least one selected programmable operating characteristic of the base unit to be modified; and
(k) non-volatile information storage means for storing data used to identification ("BASE-ID") code uniquely identifying the base unit and a phone number to be dialed by the base unit.

29. The base unit as in claim 22, further comprising:
memory means for digitally storing a pre-recorded message(s) and internal operating instructions of the base unit.

30. A programmable personal monitoring system for monitoring possible alert situations by a remote central monitoring station wherein the monitoring system can initiate communication with the monitoring station via a telephone communications link, the system comprising:
a plurality of transmitter units, each transmitter unit being operable to transmit a separate coded signal indicative of a predetermined situation, each of the transmitter units including an encoding means for providing an encoding scheme in order to establish the coded signal, the encoding means including a transmitter identification encoder circuit having an encoder chip with a plurality of three-state inputs and having a plurality of input switches connected to the three-state inputs, and wherein the input switches establish three possible logic states for at least some of the inputs, with the three logic states being a logical 0 state, a logical 1 state, and an open state; and
a base unit positionable within a predetermined short distance of each of the plurality of transmitter units, the base unit operable to receive and decipher the coded signal from each of the transmitter units and automatically establish the communication link between the base unit and the monitoring station, wherein information is transferred from the base unit to the monitoring station including a serial number of the base unit and a code for a predetermined alert situation.

31. The monitoring system according to claim 30 wherein the base unit further includes:
(a) microcomputer means for controlling the operation of the base unit, the microcomputer means including a series of input and output ports for electrical connection to additional circuitry of the base unit, the microcomputer means further including a non-volatile erasable, programmable read-only memory chip which stores at least one phone number which the base unit is to dial and transmitter identification codes of the transmitter unit;
(b) battery circuit means for applying battery power from a battery to the base unit in the event that AC power is interrupted, the battery circuit means including a battery charger section which charges the battery when AC power is being received;
(c) low battery monitoring circuit for monitoring low battery power of the battery and providing a signal indicative of low battery power; and
(d) input means connected to the microcomputer for generating a test signal for initiating the operation of test circuit means.

32. The monitoring system according to claim 30 wherein the base unit further includes:
(e) receiver circuit means for receiving the coded signals from each of the transmitting units and providing decoded signals to the microcomputer means indicative of these received signals, the receiver circuit means including an oscillator for recreating the frequency of the received signals, and wherein
the test circuit means includes micropower transmitter means for generating a high frequency pulse-modulated signal in response to a digital control signal from the microcomputer.

33. The personal monitoring system according to claim 30 wherein the encoder chip has at least nine inputs, and at least five of the inputs are three-state inputs used in connection with specifying a transmitter identification ("XMTR-ID") code.

34. The personal monitoring system according to claim 33 wherein the XMTR-ID code is specified by at least six inputs, and wherein another one of the nine inputs is used to specify a low battery condition, and another two of the nine inputs are reserved for use in specifying one or more pre-determined alert conditions which may exist at a transmitter unit.

35. The personal monitoring system according to claim 34 wherein inputs one through six are used to specify the XMTR-ID code, inputs seven and eight are used in specifying the one or more pre-determined conditions, and input nine is used in specifying the low battery condition.

36. The personal monitoring system according to claim 30 wherein the encoder circuit outputs a serially coded data bit stream at approximately 2 Khz, and wherein the transmitter unit includes an oscillator circuit responsive to the serially coded data bit stream, the oscillator circuit operating at a resonant frequency of approximately 418 Mhz, and producing a pulse code modulated high frequency signal at approximately 418 Mhz in accordance with the serially coded data bit stream.

37. In a monitoring system for monitoring possible distress or alert situations detected and signalled by a plurality of wireless transmitter units sending pulse-code low-power radio signals at a common high frequency and communicating the signals to a remote central monitoring station via a telephone communications link, a base unit for receiving and deciphering the coded low-power radio signals and automatically establishing a communications link between the base unit and the monitoring station, said base unit comprising:
microcomputer means for controlling the operation of the base unit, said microcomputer means including a non-volatile erasable programmable read-only memory chip that stores transmitter identification codes of the transmitter units and a number of predetermined telephone numbers;
modem chip means for interfacing the base unit with a telephone system, said microcomputer means able to be programmed remotely over the telephone system;

caller ID chip means for generating a signal indicative of a caller identification number when the modem chip means receives a telephone call, said microcomputer means being responsive to a signal from the caller ID chip means indicative of the caller identification number, said base unit providing an indication of the caller number as deciphered by the icrocomputer means, said caller identification number being stored in the read-only memory chip;

line-seize relay means for seizing telephone lines of the telephone system for use by the base unit in the event the telephone lines are being used for other purposes;

battery circuit means for applying battery power from a battery to the base unit in the event that a AC power is interrupted, said battery circuit means including a battery charger section which charges the battery when AC power is being received;

low battery monitoring circuit for monitoring low battery power of the battery and providing a signal indicative of low battery power;

receiver circuit means for receiving pulse-coded signals from each of the transmitting units and providing decoded signals to the microcomputer means indicative of this signal;

an interface section operable to provide a user interface to the microcomputer means, said interface section including a plurality of manual input devices; and audio circuit means for providing an audible signal in response to a message received from the monitoring station through the telephone connection, said audio circuit means being responsive to the modem circuit means for providing the signals from the monitoring station.

* * * * *